J. MANES.
Girders and Columns.

No. 157,920.　　　　　　　　　　Patented Dec. 22, 1874.

Witnesses:
Henry N. Miller
Thomas Byrne

Inventor:
James Manes
Per H. S. Abbot.
Attorney

UNITED STATES PATENT OFFICE.

JAMES MANES, OF PITTSBURG, PENNSYLVANIA.

IMPROVEMENT IN GIRDERS AND COLUMNS.

Specification forming part of Letters Patent No. 157,920, dated December 22, 1874; application filed March 10, 1874.

*To all whom it may concern:*

Be it known that I, JAMES MANES, of Pittsburg, in the county of Allegheny and State of Pennsylvania, have invented certain new and useful Improvements in Iron Beams, Girders, or Columns, of which the following is a specification:

The nature of my invention consists in a column, beam, girder, or other similar article, made in a single piece of lap or butt welded iron pipe, corrugated and lined with oak or other suitable material, as will be hereinafter more fully set forth.

In order to enable others skilled in the art to which my invention appertains to make and use the same, I will now proceed to describe the process by which I manufacture the columns or other articles from wrought-iron pipe, referring to the annexed drawing, in which—

Figure 1:
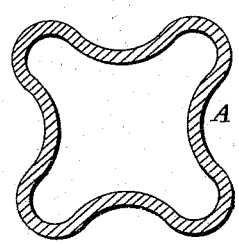
Figure 2:
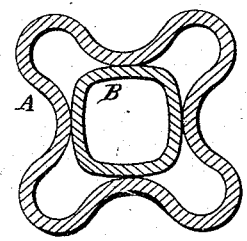
Figure 3:
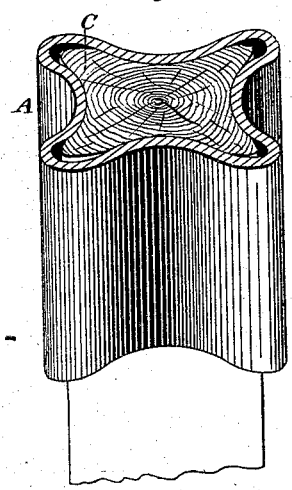

Figure 1 is a cross-section of a column made by my process. Fig. 2 is a similar section of the same provided with an interior lining of iron pipe. Fig. 3 is a perspective view, showing the column provided with an interior lining of wood.

My process of manufacturing columns, beams, girders, and other similar articles comprises five different stages, as follows:

First, the iron is rolled in the usual manner in long narrow sheets, of any length and thickness required.

Second, these sheets are planed or shaved off at the edges, so that when the edges are put together they will form a lap-joint of the same, or about the same, thickness as the balance of the sheet.

Third, the sheets are heated and drawn through a suitable die or machinery to give them the form of a round pipe.

Fourth, this is then again heated up to a welding-heat, and run through a pair of rollers, which are running perpendicular. Both of these rolls should be grooved half-round, and a mandrel or anvil placed on a long bar comes in between said rolls, the pipe passing around the mandrel or anvil, which thoroughly welds the iron in the form of a round pipe.

Fifth, the pipe thus made is reheated and rolled through four rolls, two of which run perpendicular and two horizontal, with a mandrel or anvil placed in the center of said four rolls, so as to form the pipe to the shape shown in the drawing, or any other shape required.

The corrugated hollow pipe thus formed is lined with timber, iron, steel, or other metal, forced in by hand, steam, or hydraulic pressure, which will give them extra strength and durability.

These pipes may be used for a variety of purposes—to form columns, beams, or girders for building houses, bridges, ships, factories, &c. They may also be used for line-shafting for machinery, and, when made fancy, corrugated for pallisadings, railings, fences, and many other similar purposes. They are strong, durable, and light, and can be manufactured cheaper than those heretofore used for such purposes.

Butt-welded pipe may be used in the same manner by drawing it through tongs instead of rollers for welding the edges together, and the corrugations formed by drawing it through tongs, dies, or other suitable machinery when red-hot.

In the accompanying drawing, A represents the corrugated pipe formed by my process. B is the iron lining for the same, and C the wooden lining.

Having thus fully described my invention, what I claim as new, and desire to secure by Letters Patent, is—

The column, girder, or beam A, made hollow and corrugated, and provided with a lining, C, as an inner brace for the corrugated surfaces, substantially as shown and described.

In testimony that I claim the foregoing as my invention I hereunto affix my signature this 25th day of February, 1874.

JAMES MANES.

Witnesses:
ROBT. S. FRAZER,
FRANK SMITH.